United States Patent [19]
Hopfer et al.

[11] Patent Number: 5,455,876
[45] Date of Patent: Oct. 3, 1995

[54] HIGH-SPEED EXTERNAL INTEGRATED OPTICAL MODULATOR

[75] Inventors: Samuel Hopfer, Jerusalem; Yosef Shani, Maccabim, both of Israel

[73] Assignee: General Microwave Israel Corporation, Jerusalem, Israel

[21] Appl. No.: 274,313

[22] Filed: Jul. 13, 1994

Related U.S. Application Data

[63] Continuation-in-part of Ser. No. 965,191, Oct. 23, 1992, Pat. No. 5,339,369.
[51] Int. Cl.$^6$ .................................................. G02B 6/12
[52] U.S. Cl. ...................... 385/2; 385/1; 385/3; 385/14; 385/40
[58] Field of Search ................................. 385/1, 2, 3, 4, 385/8, 9, 14, 15, 16, 24, 27, 31, 39, 40, 41, 130, 131, 132; 333/33, 26, 206, 243, 244, 245, 219

[56] References Cited

U.S. PATENT DOCUMENTS

| | | | |
|---|---|---|---|
| 4,198,116 | 4/1980 | Papuchon | 385/2 X |
| 4,683,448 | 7/1987 | Duchet et al. | 385/2 X |
| 4,709,978 | 12/1987 | Jackel | 385/3 X |
| 4,861,130 | 8/1989 | Katsuyama et al. | 385/2 X |
| 4,870,375 | 9/1989 | Krueger, Jr. et al. | 333/33 |
| 4,884,044 | 11/1989 | Heywood et al. | 385/2 X |
| 5,015,052 | 5/1991 | Ridgway et al. | 385/1 X |

(List continued on next page.)

OTHER PUBLICATIONS

Walker: IEEE Journal of Quantum Electronics; vol. 27, No. 3; Mar. 1991; High-Speed III-V Semiconductor Intensity Modulators.
Chung et al.; IEEE Journal of Quantum Electronics; vol. 27, No. 3; Mar. 1991; Modeling and Optimization of Traveling-Wave LiNbO$_3$ Interferometric Modulators.
Kao et al.; Electronics Letters; vol. 28, No. 7, Mar. 26, 1992; 2.5 Gbit/s Ti:LiNbO$_3$ External Modulator Transmitter and Its Long Distance Transmission in the Field.
Ishikawa; Electronics Letters; vol. 28, No. 6; Mar. 12, 1992; Polarisation-Independent LiNbO$_3$ Waveguide Optical Modulator for Bidirectional Transmission.
Gopalakrishnan et al.; Electronics Letters; vol. 28, No. 9; Apr. 23, 1992; 40 GHz Low Half-Wave Voltage Ti:LiNbO$_3$ Intensity Modulator.
Miyamoto et al.; Electronics Letters; vol. 28, No. 11; May 21, 1992; Evaluation of LiNbO$_3$ Intensity Modulator Using Electrodes Buried In Buffer Layer.
Dolfi et al.; Electronics Letters; vol. 28, No. 13; Jun. 18, 1992; 50 GHZ Velocity-Matched Broad Wavelength LiNbO$_3$ Modulator With Multimode Active Section.
Noguchi et al.; IEEE Photonics Technology Letters; vol. 3 No. 4; Apr. 1991; A Ti:LiNbO$_3$ Optical Intensity Modlulator With More Than 20 GHz Bandwidth and 5.2 V Driving Voltage.
Rangaraj et al.; IEEE Photonics Technology Letters; vol. 4 No. 9; Sep. 1992; A Wide-Band Ti:LiNbO$_3$ Optical Modulator With a Conventional Coplanar Waveguide Type Electrode.
Alferness; IEEE Transactions On Microwave Theory and Techniques; No. 8, vol. MIT-30; Aug. 1982; Waveguide Electrooptic Modulators.
Jungerman et al.; IEEE Journal of Quantum Electronics; vol. 27, No. 3; Mar. 1991; Frequency Domain Optical Network Analysis Using Integrated Optics.

Primary Examiner—Brian Healy
Attorney, Agent, or Firm—Volpe and Koenig

[57] ABSTRACT

An improved high-speed external optical modulator, modulated by RF waves, which velocity matches the RF waves with the optical waves is disclosed. The apparatus includes a lithium niobate substrate on which is formed an optical waveguide, electrically floating electrodes, a low dielectric buffer layer and electrodes carrying the modulating RF energy. At least one floating electrode may comprise a series of spaced electrode segments for enhanced performance at high frequencies.

18 Claims, 6 Drawing Sheets

U.S. PATENT DOCUMENTS

| | | | |
|---|---|---|---|
| 5,091,981 | 2/1992 | Cunningham | 385/3 |
| 5,129,017 | 7/1992 | Kawano et al. | 385/3 |
| 5,138,480 | 8/1992 | Dolfi et al. | 385/3 X |
| 5,148,503 | 9/1992 | Skeie | 385/3 |
| 5,189,713 | 2/1993 | Shaw | 385/2 X |
| 5,198,786 | 3/1993 | Russell et al. | 333/26 |
| 5,208,697 | 5/1993 | Schaffer et al. | 385/3 X |
| 5,214,724 | 5/1993 | Seino et al. | 385/2 |
| 5,220,627 | 6/1993 | Kawano et al. | 385/3 |
| 5,230,028 | 7/1993 | Lin et al. | 385/3 |
| 5,259,044 | 11/1993 | Isono et al. | 385/2 |
| 5,339,369 | 8/1994 | Hopfer et al. | 385/2 |

HIGH-SPEED EXTERNAL INTEGRATED OPTICAL MODULATOR

This application is a continuation-in-part of application Ser. No. 07/965,191, filed on Oct. 23, 1992, now U.S. Pat. No. 5,339,369, issued Aug. 16, 1994.

BACKGROUND OF THE INVENTION

1. Field of the Invention

The present invention relates generally to optical modulators, and more specifically to external electro-optical modulators.

2. Description of the Prior Art

Telecommunication systems using fiber optic components are becoming increasingly popular. Basic components of fiber optic systems may include a laser diode, a modulator and a photodetector diode. Modulators are either direct (modulating the optical wave as it is being generated at the source) or external (modulating the optical wave after it has been generated). The design of laser diodes and photodetector diodes is known. However, a major problem with an optical communication system is its dynamic range, which is largely determined by the distortion from the modulator.

An electro-optical modulator modulates the optical wave with an electromagnetic or RF signal. The RF signal interacts with the optical wave over a pre-determined distance. The construction of optical modulators slows the RF wave relative to the optical wave so that it takes the RF wave a longer period of time to travel the interaction distance. Therefore, the electric field, which modulates the optical wave, varies along the interaction distance. Since the RF wave does not act on the same portion of the optical wave throughout the interaction distance, the optical wave is distorted. The longer the interaction distance, the greater the distortion.

There have been many attempts to decrease modulator distortion. One solution is to decrease the interaction distance. However, this attempted solution requires an extremely large electric field to obtain the same phase shift in the optical wave.

Another solution to reduce modulator distortion is to use a compensation means. After an initial interaction between the RF wave and the optical wave, the two waves are separated, a method of compensating for the phase difference is employed and the waves are brought together to interact again. This process is repeated many times. An idling method, in which the RF voltages in the RF carrying electrodes are switched in a periodic or in an aperiodic fashion, is one method of compensating for the phase differences. For example, in a modulator of the Mach-Zehnder configuration, a 180° phase shift is needed between the two signal branches. This method is inefficient since a very high voltage is needed to come to extinction. Further, these compensation attempts, although capable of working at high frequencies, are either not broadband or suffer from irregular frequency response. Most methods to compensate for the difference in speed between the RF wave and the optical wave have been unwieldy, impractical or expensive to implement.

SUMMARY OF THE INVENTION

A primary object of the present invention is to provide an improved optical modulator.

It is another object of the invention to velocity match the RF wave with the optical wave in an electro-optical modulator.

It is a further object of the invention to provide an electro-optical modulator of approximately 50 Ω characteristic impedance which reduces the radio frequency (RF) power requirements.

The instant invention is an electro-optic modulator in which the RF waves are velocity matched with the optical waves so that the RF waves propagate at the same speed as the optical waves during the interaction distance.

In the preferred embodiment, these and other objects and advantages are achieved by creating a medium for the RF wave that has the same effective dielectric constant as the optical waveguide and by introducing a mechanism which maximizes the electric field across the optical waveguide. Accordingly, a buffer layer of a relatively low dielectric constant and electrically floating electrodes are placed between the RF electrodes and the substrate.

DETAILED DESCRIPTION OF THE PREFERRED EMBODIMENT

Figure 1:
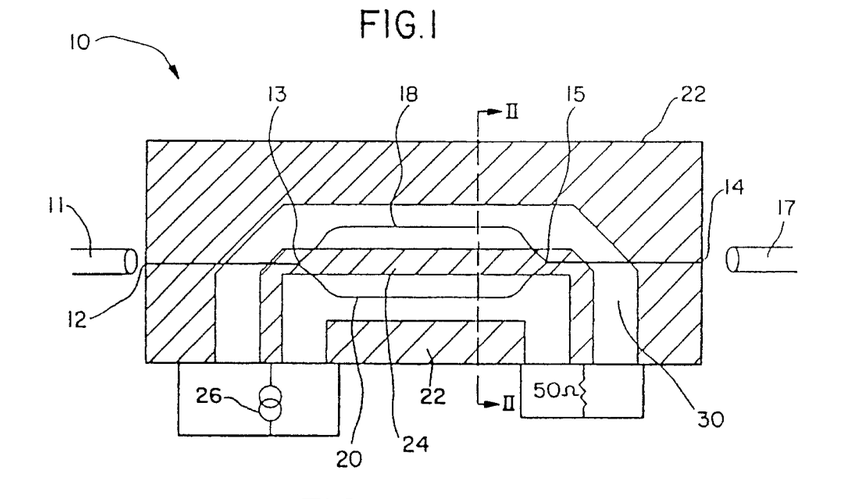
FIG. 1 is a top plan view of a Mach-Zehnder modulator embodying this invention.

The Mach-Zehnder configuration is a known modulator design. The Mach-Zehnder modulator uses an interferometric technique in order to amplitude modulate the optical wave. As seen in FIG. 1, the Mach-Zehnder design splits the incoming optical wave into two (2) paths and utilizes an electromagnetic or radio frequency (RF) signal to modulate the optical wave in one or both optical waveguides. The two (2) optical waves are then combined into a single signal. Although the techniques described herein can be applied to any optical modulator using RF energy, reference is made to the Mach-Zehnder design as an example.

Reference numeral 10 generally indicates the modulator. The fiber optic cable 11, originating from the light source or laser, is connected to the optical input 12 of the modulator 10. The optical wave is split into two equal signals by a Y-connection 13.

RF energy is supplied by a signal generator 26. The RF energy is conducted within the modulator 10 by RF electrodes 22, 24. The optical wave travels down waveguides 18 and 20, and during that time of travel, the electrical field of the RF signal modulates the optical wave. The distance in which the RF waves interact with or modulate the optical waves is called the interaction distance, and is determined primarily by the modulator design and the power of the RF signal generator.

A second Y-connection 15 combines the two phase-shifted optical signals into a single, amplitude modulated optical signal. Fiber optic cable 17 is connected to the optical output 14 of the modulator 10. Fiber optic cable 17 delivers the modulated signal to the next device in the optical communication system.

Figure 2:
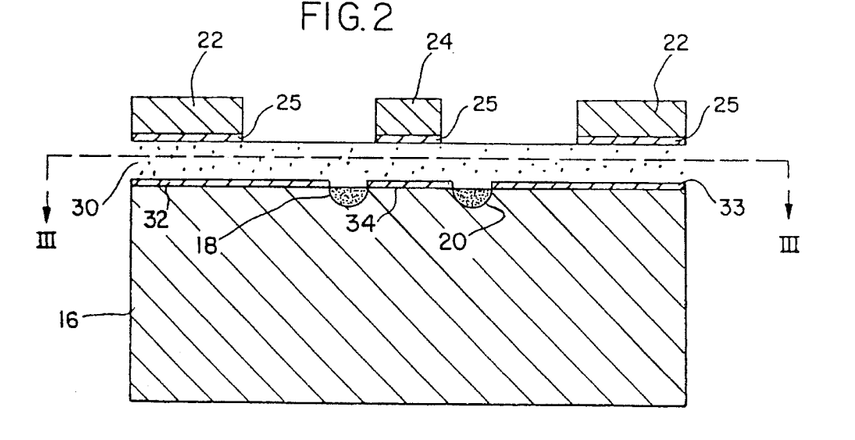
FIG. 2 is a cross-sectional view taken along line II—II of FIG. 1.

Referring to FIG. 2, the modulator 10 includes a substrate 16 which is preferably made of X-cut lithium niobate (LiNbO$_3$) and is approximately 1000 microns (μm) high. The length and width of substrate 16 depend on the modulator design and should be sufficient to support the optical waveguides and the RF electrodes. Other electro-optic materials can be used as the substrate.

In the preferred embodiment, the optical waveguides 18, 20 are positioned entirely within the substrate 16. The waveguides 18, 20 are created by diffusing titanium into the substrate 16. In practice, a strip or channel is made in the substrate 16. Titanium is placed in the channel and the temperature of the substrate is raised so that the titanium diffuses into the substrate forming the waveguides 18, 20. The waveguides 18, 20 are approximately seven (7) microns wide and approximately three (3) microns deep.

Figure 2A:
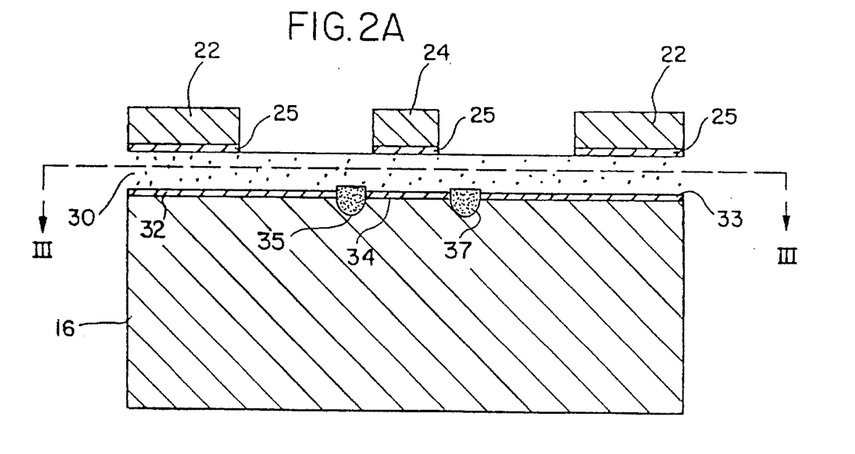
FIG. 2A is a cross-sectional view of an alternate embodiment of the invention taken along line II—II of FIG. 1.

FIG. 2A is an alternate embodiment of the optical modulator which utilizes ridged optical waveguides 35, 37. The waveguides 35, 37 are approximately four (4) microns wide and three (3) microns high, and are approximately 1.5 microns above the surface of the substrate 16. The use of ridged optical waveguides 35, 37 in conjunction with the lower electrode system reduces the extinction voltage Vπ by a factor greater than two (2), due to the smaller dimensions of the waveguides and the greater uniformity of the RF field in the waveguides.

The waveguides 35, 37 are formed in the same manner as previously discussed with the diffusion of Titanium into the LiNbO$_3$ substrate. Subsequently, the LiNbO$_3$ at the sides of the waveguides is etched away to a depth of approximately 1.5 microns, leaving a protrusion or "ridge" above the surface of the substrate 16. This type of waveguide is called a "ridged waveguide" The advantage of using a ridged waveguide geometry in the interaction space is twofold. First, the width of the waveguide can be reduced from seven (7) microns of the previous embodiments to about four (4) microns resulting in a much higher electric intensity for a given voltage between the secondary electrodes. Secondly, with the electrodes deposited on the etched LiNbO$_3$ surface the uniformity of the field over the waveguide cross section is greatly improved and thus the value of the overlap integral Γ, increased. By adding this feature, the required RF voltage for full extinction may be reduced by as much as a factor of two (2), or a six (6) dB improvement in power.

The RF power electrodes 22, 24 are preferably made from gold but can be composed of any conductive metal or metal alloy, e.g. silver, copper, etc. The RF electrodes 22, 24 can be placed using any of the common methods of adhering metal to substrate materials. The preferred method is to deposit the gold using electroplating or sputtering techniques. A 50–80 angstrom (Å) sub-layer 25 of titanium is preferably deposited to improve the adhesion of the gold to the substrate.

The RF electrodes 22, 24 are connected to an RF transmission line which delivers RF power from a signal generator. A common type of transmission line is a coaxial cable. The center RF electrode 24 is connected to the center conductor of the coaxial cable which originates from the signal generator 26. The shield or outer conductor of the coaxial cable is electrically connected to electrodes 22. In the typical Mach-Zehnder modulator, the width and thickness of the RF electrodes are determined by the design of the modulator.

FIG. 2 shows a cross section of a modulator of this invention using the Mach-Zehnder design. A dielectric buffer layer 30 is situated between the RF electrodes 22, 24 and the substrate 16. The dielectric buffer layer 30 has a dielectric constant (ε) lower than the dielectric constant of the substrate 16. The velocity of the RF waves increases since the effective dielectric constant has been lowered. The preferred buffer layer material is a polyimide, for example, Dupont TI2611 with a ε=2.7. The thickness of the dielectric buffer layer 30 is approximately ten (10) microns. In this invention, the RF electrodes 22, 24 are electroplated over the dielectric buffer layer 30. The buffer layer 30 creates a medium for the RF wave that has the same effective dielectric constant as the medium in which the optical wave travels. This has the effect of velocity matching the RF wave with the optical wave.

It is also desirous to reduce the interaction distance and to maximize the voltage across optical waveguides 18, 20, which will reduce the size of the modulator and reduce power requirements. In this regard, electrically floating electrodes are placed over the substrate 16 and below the dielectric buffer layer 30. These floating electrodes are individual strips of metal or metal alloy which are not physically connected to any other element. The floating electrodes increase the shunt capacitance between the RF electrodes. In the preferred embodiment, three (3) floating electrodes 32, 33, 34, are employed and are situated substantially parallel to the optical waveguides in a modulator of the Mach-Zehnder configuration (see FIG. 3). The preferred width of the center electrode 34 is approximately fifty (50) microns while the outer floating electrodes 32, 33 are approximately one hundred (100) microns wide. There is approximately a twenty-five (25) micron gap between the center floating electrodes 34 and each outer electrode 32, 33.

Figure 3:
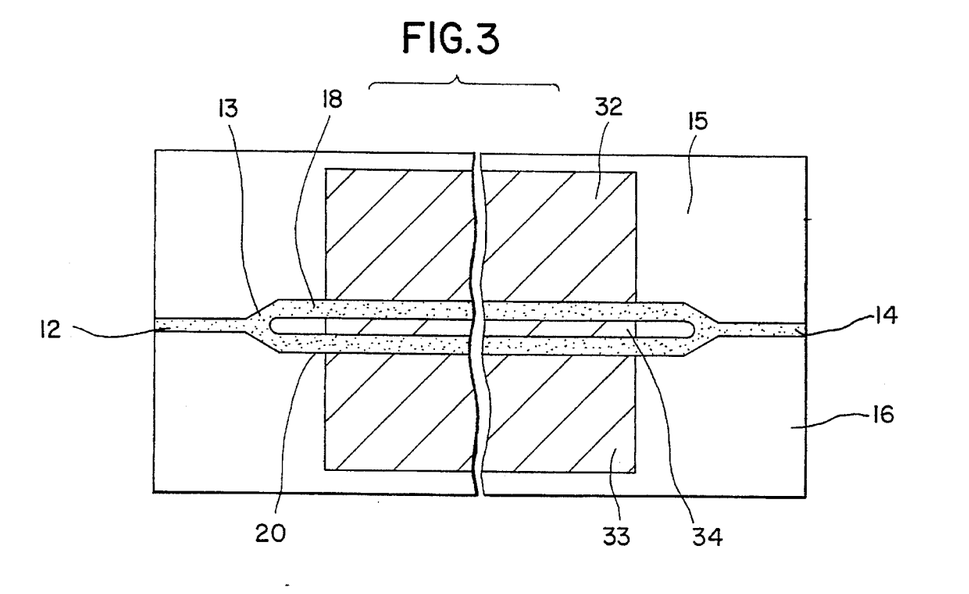
FIG. 3 is a cross-sectional view taken along line III—III of FIG. 2.

The floating electrodes 32, 33, 34 are approximately the same length as the interaction distance. The optical waveguides 18, 20 are situated substantially underneath the gaps in the floating electrodes. In the preferred embodiment, the floating electrodes 32, 33, 34 are gold. The floating electrodes 32, 33, 34 are preferably vacuum deposited to a thickness of approximately 1000 angstroms (Å). Again, titanium may be used to improve the adhesion of the floating electrodes 32, 33, 34 with the substrate.

The purpose of the electrically floating electrodes 32, 33, 34 is to apply the available voltage across the dielectric layer, directly to the optical waveguide, for greatest electric field intensity. Because of the addition of the floating electrodes 32, 33, 34, the design of the RF transmission electrodes 22, 24 becomes substantially independent of the dimensions of the optical waveguide. As a result, the RF electrodes 22, 24 can be designed to match the source impedance of standard signal generators (microwave sources), namely 50 Ω. This allows the modulator 10 to operate over an extremely broad frequency band. In addition, due to the use of floating electrodes 32, 33, 34 the modulator 10, subject to the conditions of velocity matching and contact characteristic impedance, can be scaled for increased dimensions to achieve lower attenuation of the microwave signal along the interaction distance and thus increase bandwidth.

In the preferred embodiment, the center RF electrode 24 is approximately 50 μm wide and the outer RF electrodes 22 are approximately 685–700 μm wide. The height of the RF electrodes 22, 24 is approximately 3 μm. There is approximately a 40 μm gap between the center RF electrode 24 and each of the outer RF electrodes 22.

The instant invention's features allows the modulator 10 to operate over extremely large bandwidths limited only by the attenuation of the microwave signal and requiring a minimum of RF power for its operation.

The electro-optic effect relates to the change in the index of refraction of the material to the applied electric field. The effect is small and linear for the substances under consideration. It is desirable to use a substrate 16 with a relatively high electro-optic coefficient ($r_{33}n^3$). Accordingly, lithium niobate ($LiNbO_3$) was chosen as the substrate 16. However, it should be noted that other electro-optic materials, such as gallium arsenide (GaAs), may also be used.

The electro-optic effect depends on the direction of the electric field relative to the orientation of the crystalline structure of the substrate along which the optical wave propagates. There are two practical choices in which to situate the optical wave guides 18, 20 with respect to the RF carrying electrodes 22, 24. The first situation is where the optic axis is parallel to the plane of the substrate and at right angles to the direction of propagation of the optical wave, called an x-cut. The other choice is one in which the optic axis is normal to the plane of the substrate, referred to as a z-cut. In the preferred embodiment, the x-cut is selected. In either case, the applied electric field for maximum electro-optic interaction is in the direction of the optic axis, and the resulting change in the index of refraction, $\Delta n$, is given by:

$$\Delta n = \frac{-n^3}{2} (r_{33}E_j) \quad (1)$$

where n is the index of refraction, $E_j$ is the electric field intensity in the direction of the optic axis, and $r_{33}$ is the largest electro-optic tensor element associated with $E_j$. It can be seen from equation (1) that $\Delta n$ changes in accordance with $E_j$, so that if $\Delta n>0$, the optic wave is slowed while if $\Delta n<0$, the velocity of the optic wave increases. Thus, by changing $E_j$, the optical wave can be phase modulated, producing a change in phase per unit length, β, given by:

$$\beta=(2\pi/\lambda)(\Delta n) \quad (2)$$

where λ is the free-space wavelength of the optical wave.

In order to change the phase modulated optical wave into an intensity modulated wave, which is considered to be most desirable from the standpoint of the detection process in an optical communications system, a Mach-Zehnder interferometer arrangement is commonly employed. The incident optical wave is split into two branches and recombined to form a single output wave. If the two branches or waveguides 18, 20 are phase modulated by equal and opposite electrical fields, as is the common practice, then the normalized output power, $P_o$, is given by:

$$P_o=\cos^2\Delta\phi \quad (3)$$

where $\Delta\phi$ is one-half of the accumulated phase difference between the two branches of length L, and is given by:

$$\Delta\phi=(\overline{\Delta\beta}L)/2 \quad (4)$$

where $\overline{\Delta\beta}$ is the average per unit length phase difference. For $\overline{\Delta\beta}$ L= π, $P_o$=0, and full extinction occurs. Expanding $\cos^2\Delta\phi$ about π/4, yields:

$$\cos^2(\pi/4+\phi)=\frac{1}{2}-\phi-\frac{2}{3}(\phi)^3= \ldots \quad (5)$$

Therefore, a biased external modulating field, $E_j$, produces an intensity modulated optical output wave directly proportional to $E_j$, containing only odd harmonics which depend on the amplitude of $\Delta\phi$. Since the small signal detected output voltage is proportional to the intensity of the modulated wave, the overall process is essentially linear. Thus, assuming that the detector is not bandwidth limited, the normalized output of the detector, as a function of frequency, depends only on the frequency dependence of $\Delta\phi$. The bandwidth of the modulator is normally defined as that frequency at which $\Delta\phi$ decreases to $1/\sqrt{2}$ of its low frequency value, resulting in a 3 dB drop in the modulated output power.

Figure 4:
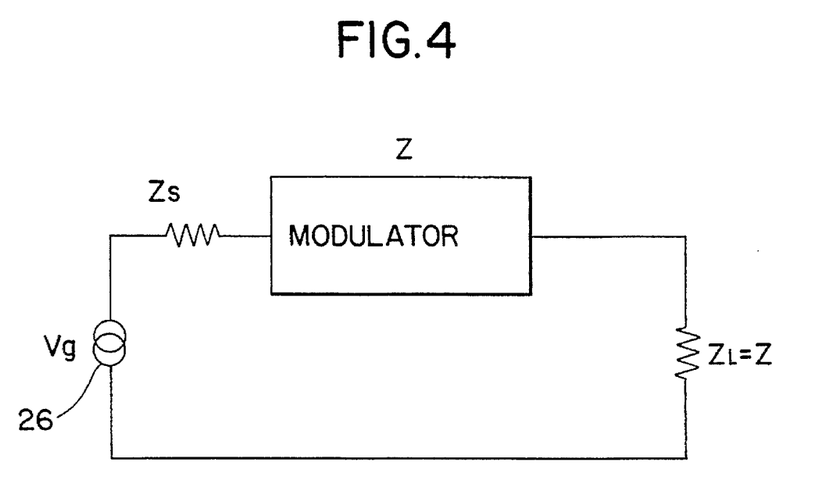
FIG. 4 is a schematic block and circuit diagram used for explaining the modulator of this invention.

In a recent paper by, Chung et al., *Modeling and Optimization of Traveling Wave LiNbO₃ Interferometric Modulators*, IEEE Journal of Quantum Electronics, Vol. 27, No. 3, March 1991, the functional dependence of $\Delta\phi$ is placed in a form which allows more insight with respect to the optimization of the various parameters. That is:

$$\Delta\phi(t)=[Z/(Z+Z_s)]V_g\cos(2\pi ft) L\kappa FH(f) \quad (6)$$

where $[Z/(Z+Z_s)]V_g\cos(2\pi ft)$ represents the voltage applied by generator 26 of output $V_g\cos(2\pi ft)$ and $Z_s$ is the source impedance to each of the two branches of the Mach-Zehnder modulator of characteristic impedance and terminating impedance Z, as shown in FIG. 4.

The RF frequency is f, L is the length over which the modulating RF field is applied to the optical wave, and κ is a constant given by:

$$\kappa=(\pi/\lambda)r_{33}n^3 \quad (7)$$

H(f) is a function of frequency only, and is given by:

$$H(f)=\left[\frac{\sinh^2(\alpha L/2)+\sin^2(\phi L)/2}{(\alpha L/2)^2+(\phi L/2)^2}\right]^{+1/2} \exp(\alpha L/2) \quad (8)$$

where α is the attenuation constant of the electrical wave in nepers per unit length, and ϕ is given by:

$$\phi=2\pi f(n^m-n^o)/c \quad (9)$$

where $n^m$ and $n^o$ are the indices of refraction of the microwave and optical waves, respectively, and c is the velocity of light in free space.

Physically, H(f) expresses the frequency dependence of $\Delta\phi$ due to two causes. The first is that the electric wave is attenuated as it propagates along L, a condition which changes with frequency. The second is that the difference in the phase velocities of the electrical and optical waves, due to their different indices, causes the accumulated phase difference over L to be frequency dependent.

The factor F, to which the optical waveguide cross section is exposed per unit length in equation (6), represents the effective electric field per volt applied to the electrodes 22, 24 which form the coplanar RF waveguide. Since $E_j$ varies over the cross section of the optical waveguide, its effect on the change of the index of refraction, Δn, is not uniform. In order to obtain a properly averaged Δn due to this non-uniformity of the electric field, its effect at any differential area element in the cross section must be weighted by the fractional power which is carried at that point by the optical wave. Thus, F is expressed by:

$$F = \frac{v}{g} \Gamma \tag{10}$$

where $$\Gamma = (g/v) \iint E_j(x,z) |E'|^2 dA \tag{11}$$

Figure 6:
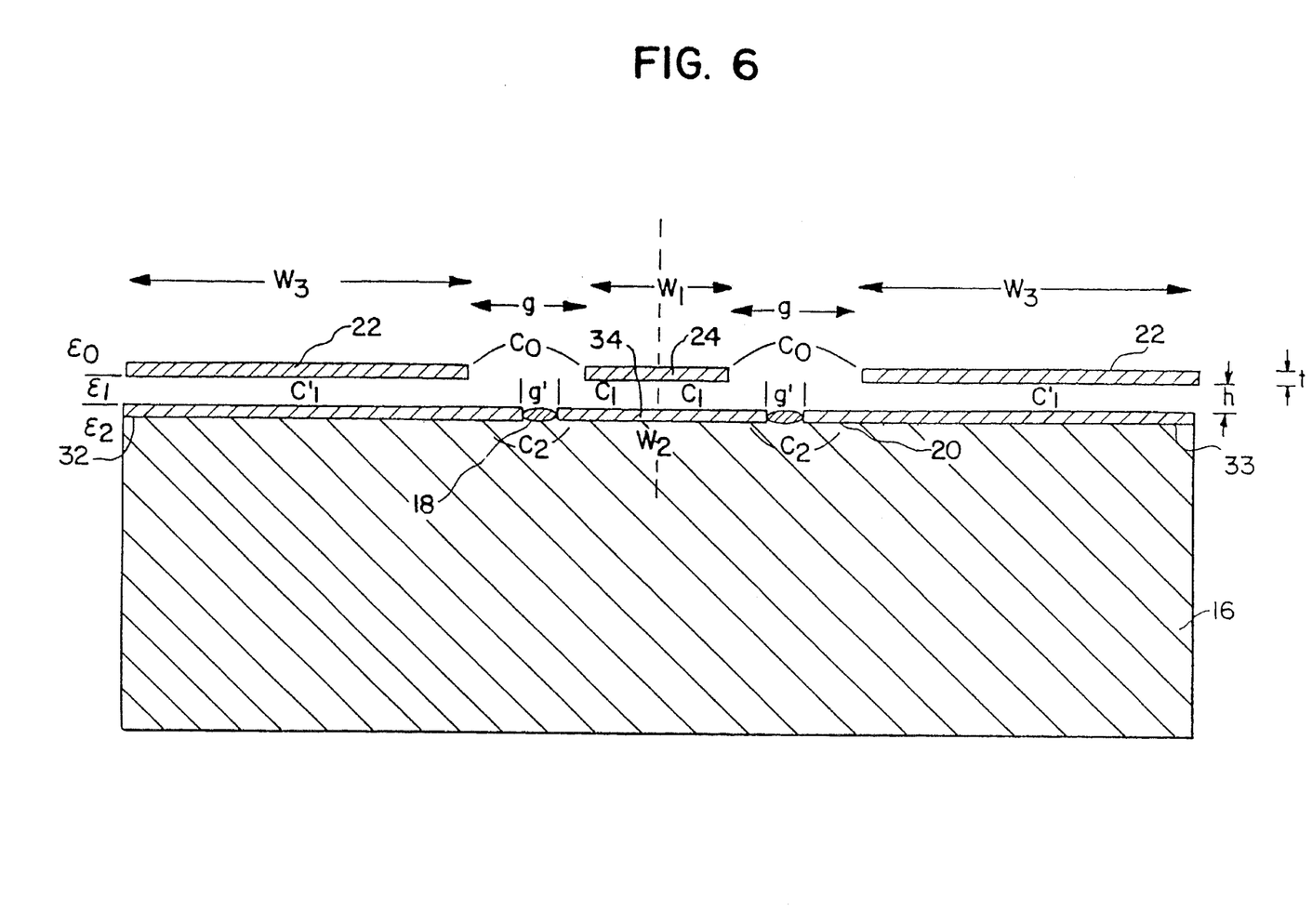
FIG. 6 is a cross-sectional view of a Mach-Zehnder modulator and the capacitances associated with the parts thereof.

In equation (11), $E_j(x,z)$ is the cross-sectional electrical field per unit voltage on the RF electrodes 22, 24, and g is the gap distance between the electrodes 22, 24 as illustrated in FIG. 6. $|E'|$ is the normalized electric field on the optical wave, such that $|E'|^2 dA = 1$. The constant g/v introduced in equation (11) derives from normalizing $E_j(x,z)$ against a constant field g/v, so that if $E_j(x,z)$ were such a constant field, Γ would be unity. Γ is the overlap integral and is generally less than unity. As will be apparent to those skilled in the art, the above relationships are also applicable to the gap g' between the floating electrodes 32, 33, and 34 when such electrodes are employed as in the present invention.

It is desirable to design a broadband modulator, i.e., one which can be modulated about any center frequency up to the millimeter (mm) range over a wide bandwidth. From this point of view, the two most important requirements of the modulator are its bandwidth, and the generator power necessary to drive the modulator. Since the actual drive power depends on the degree of nonlinearity one is willing to tolerate, it is customary for comparative purposes to quote the generator power necessary to achieve extinction of the optical output.

Thus, for a given bandwidth, the set of optimum design parameters is that which minimizes the microwave generator power, an item of considerable cost, particularly at high frequency. In the preferred embodiment, the bandwidth has been set at 20 GHz. On purely theoretical grounds, a true optimization procedure taking all the parameters into account which affect $V_g$ is very complex. Fortunately, it is possible to eliminate certain designs from consideration on general grounds and obtain from subsequent computer analysis a good indication of the approximate optimum for a set of realizable parameters.

A velocity matched design, one in which the electrical wave is forced to travel at the same speed as the optical wave and interact continuously with the latter, was deemed essential in order to achieve longer interaction spacings and thus be able to reduce the microwave power requirements. Evidently, in order to achieve this condition, a large portion of the electrical wave energy must, in addition to the portion which extends into the substrate 16, propagate in a much lower dielectric medium, such that the equivalent dielectric constant of the composite structure equals that of the optical waveguide, namely 4.7. In principle, one can achieve this condition in two basic ways—by putting this medium in shunt with the substrate 16, or interspace the medium in series fashion between the coplanar waveguide and the substrate 16. The former, although attractive from several points of view, reduces the already low value of the characteristic impedance, $Z_0$. The series arrangement, on the other hand, decreases the shunt capacity of the waveguide and thus raises the value of $Z_0$, making it compatible with the 50 Ω source impedance of the generator and reducing the attenuation of the RF electrodes or RF transmission line.

Layers of dielectric material situated between the substrate surface and the RF electrodes have been used for some time to minimize optical loss and waveguide loading due to the RF electrodes. This is usually done in conjunction with z-cut crystals, where the optical waveguide is located under the electrodes and must be isolated from the latter in order to prevent substantial optical attenuation. The material used traditionally for these isolation layers is silicon dioxide ($SiO_2$), with a dielectric constant of 4. However, consider the general problem of two capacitors, $C_1$ and $C_2$, in series across a transmission line to which a voltage V is applied.

If the dielectric constant corresponding to $C_1$ and $C_2$ are $\epsilon_1$ and $\epsilon_2$, respectively, then:

$$C_1 = \epsilon_1 C_1' \tag{12a}$$

$$C_2 = \epsilon_2 C_2' \tag{12b}$$

$$[(1/C_1) + (1/C_2)]^{-1} = \epsilon'[(1/C_1') + (1/C_2')]^{-1} \tag{13}$$

and the ratio of $C_2/C_1$, in terms of the effective dielectric constant $\epsilon'$ turns out to be:

$$C_2/C_1 = (\epsilon_2 - \epsilon')/(\epsilon' - \epsilon_1) \tag{14}$$

and in terms of the fractional voltage $V_2/V$ across $C_2$, we obtain:

$$V_2/V = (\epsilon' - \epsilon_1)/(\epsilon_2 - \epsilon_1) \approx (\epsilon' - \epsilon_1)/\epsilon_2 \text{ for } \epsilon_2 >> \epsilon_1 \tag{15}$$

Therefore, in order to maximize $V_2/V$, for a desired $\epsilon'$, $\epsilon_1$ should be chosen as low as possible. Accordingly, the prior art use of $SiO_2$ for the buffer layer with $\epsilon_1 = 4$ is a poor choice to achieve an effective dielectric constant, $\epsilon'$, of 4.7. A dielectric material with a dielectric constant of approximately 2 is preferred.

In addition to the introduction of a low dielectric constant buffer layer of the kind discussed above, there is another feature added which makes the design highly efficient, namely a thin conductive film pattern 32, 33, 34 deposited on the $LiNbO_3$ substrate as shown in FIGS. 2 and 3. This pattern is electrically floating, extending approximately the length of the interaction space. Its major purpose is to apply the available voltage across the smallest gap, g', containing the optical waveguide, i.e. the spacing between center floating electrode 34 and each outer floating electrode 32, 33. This allows the gap distance, g, between the RF electrodes 22, 24 to be kept relatively large and thus achieve a $Z_0$ of about 50 Ω, while at the same time maintaining maximum field intensity in the region of the optical waveguide. An examination of equations (10) and (11) shows that although F decreases as a result of decreasing g', due to the greater nonuniformity of the field pattern in the optical cross section, this decrease is more than offset by the 1/g' increase in the field intensity due to the smaller gap dimension, thus resulting in an overall increase of the F factor in equation (6).

Consider Case 1 of the following Table I, in which g' and g are the same, 11 μm each, without any penetration of the metallic film into the g space, and Case 2, in which g is increased to 14 μm and g' decreased to 8 μm. In both cases $Z_0$ is about 50 Ω, the bandwidth is 20 GHz, $\sqrt{\epsilon_{\text{eff+b}}} = 2.2$, and the attenuation constants are 2.35 dB/cm and 1.9 dB/cm, respectively. There is a substantial drop in $P_\pi$, the power required for extinction at frequency $f_o$, from 0.63 W to 0.36 W. This drop occurs despite the fact that F decreases from 0.63 to 0.57, and the voltage across the gap, g, per unit voltage across the electrodes decreases from 0.27 Volts to 0.23 Volts. This effect is even more pronounced in Case 3, where g is increased to 20 μm and g' decreased to 6 μm, subject to the same conditions of $Z_o$, $\sqrt{\epsilon_{\text{eff}}}$, and bandwidth as in Cases 1 and 2. The drop in $P_\pi$, to 0.2 W, is achieved in spite of the reduction in $\Gamma$ to a value of 0.48 and a similar drop in the gap voltage to 0.19 V. The increase in length to 4.8 cm comes from the drop in $\alpha$ to a value of 1.33 dB/cm due to the increased dimensions of the transmission line.

TABLE I

|   | $w_1$ (um) | g (um) | g' (um) | h (um) | L (mm) | $P_\pi$ (W) | $V_\pi$ (V) |
|---|---|---|---|---|---|---|---|
| 1. | 20 | 11 | 11 | 3.1 | 27 | 0.63 | 5.6 |
| 2. | 20 | 14 | 8 | 3.3 | 34 | 0.36 | 4.3 |
| 3. | 25 | 20 | 6 | 4.2 | 48 | 0.2 | 3.2 |

Figure 5:
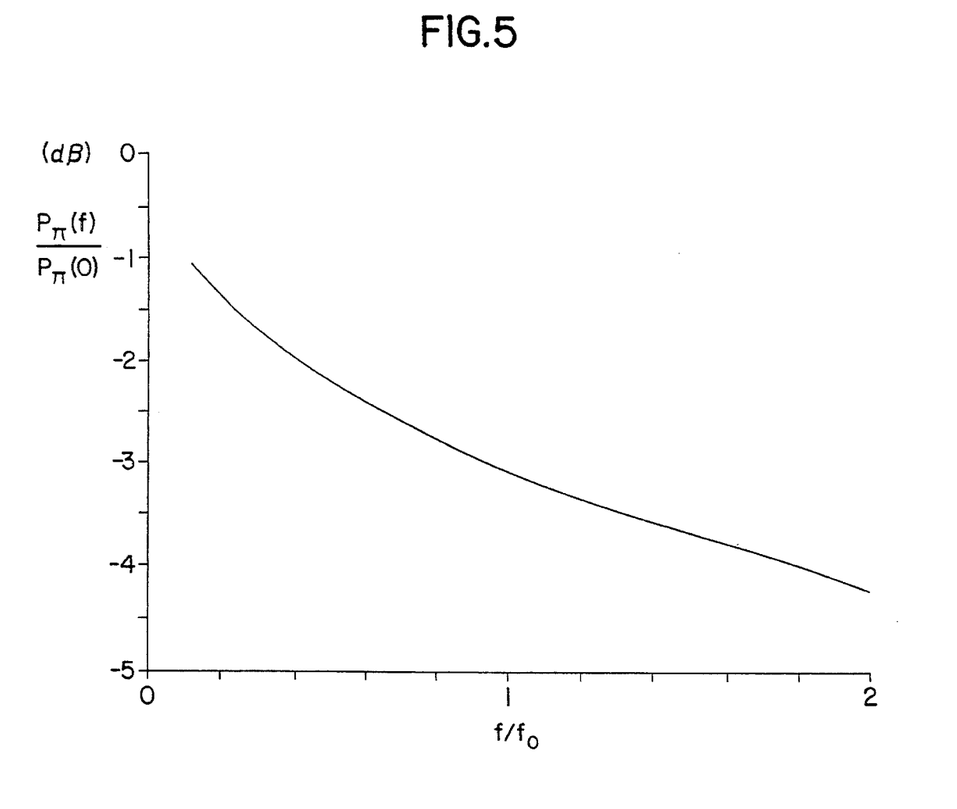
FIG. 5 is an idealized diagram of the power/frequency graphical characteristic of the modulator of this invention with power and frequency normalized.

As previously stated, a true optimization routine is a very complex task. However, if on practical grounds the maximum length, L, of the interactive section is restricted to 5 cm; the characteristic impedance, $Z_0$, of the coplanar waveguide is limited to approximately 50 Ω; the minimum dielectric constant of a suitable buffer layer material held to a value of 2; then for a perfect velocity matched design, the optimum $P_\pi$ is approximately 0.2 W. The perfect velocity matched case implies a frequency characteristic given by H(f) in equation (6) with $\phi=0$, and is shown in FIG. 5, in which the normalized extinction power, $P_\pi(f)/P_\pi(o)$, is plotted against the normalized frequency, $f/f_o$. The well behaved nature of this function allows the modulator to be used well beyond $f_o$. Thus, for $f_o=20$ GHz, the modulated output power at 40 GHz is only 1.2 dB higher than at 20 GHz.

It should be realized that the above conclusion as to the minimum $P_\pi$ applies to the x-cut case, in which the optical waveguide is located in the gap space. For the z-cut case, because of the higher $\Gamma$ which is achievable with this geometry, it should be possible through the use of a low dielectric buffer layer to achieve better values for $P_\pi$.

Consider the cross section of the modulator without the buffer and floating electrodes. The indicated partial capacities denote the following:

$C_0$ represents one-quarter of the air capacity formed by the power carrying electrode structure alone.

$C_1$ represents one-half the parallel plate air capacity under RF electrode 24, having a width $w_1$, corrected for the fringing field at the edges.

$C_1'$ represents the parallel plate air capacity under one RF electrode 22, having a width $w_3$, and may be taken as $mC_1$, where m= $2w_3/w_1$.

$C_2$ represents one-half the air capacity of the thin film electrodes.

The actual cross section as shown in FIG. 6, contains several dielectric regions. Above the RF power carrying electrodes 22, 24 is air.

Consider placing a material of thickness h and of dielectric constant $\epsilon_1$, in the space between the RF electrodes 22, 24, and a thin film pattern with the thin film pattern applied to the substrate 16 of dielectric constant $\epsilon_2$. The corresponding partial capacities under these conditions, namely $C_{00}$, $C_{11}$, $C_{11}'$ and $C_{22}$ may be related to the corresponding air capacities as follows:

$C_{00}=C_o$ $C_{11}=\epsilon_1 C_1$ $C_{11}'=\epsilon_1 C_1'$ $C_{22}=\epsilon' C_2$ where $\epsilon_2'=(\epsilon_1+\epsilon_2)/2$ (16)

If the space between the RF electrodes 22, 24 and the thin film pattern is filled with air, the total capacity between the RF power carrying electrodes $C_{T0}$, is given by:

$C_{T0}=2(C_0+C_{12})$ (17)

where $C_{12}=(mC_1C_2)/[(m+1)C_2+mC_1]$ (18)

and $m=2w_3/w_1$

Similarly, with respective dielectric buffers in place, the total capacity $C_{T2}$, is given by:

$C_{T2}=2(C_0+C_{12}')$ (19)

where $C_{12}'$ is given by:

$C_{12}'=m\epsilon_1\epsilon_2'C_1C_2/[(m+1)\epsilon_2'C_2+m\epsilon_1 C_1]$ (20)

where $\epsilon_2'=(\epsilon_1+\epsilon_2)/2$

If $\epsilon'$ is the effective dielectric constant of the entire structure of FIG. 6, then:

$2\epsilon'(C_{12}+C_0)=2(C_{12}'+C_0)$ or $\epsilon'=(C_{12}'+C_0)/(C_{12}+C_0)$ (21)

The characteristic impedance $Z_0$, is then given by:

$$Z_0=\sqrt{\epsilon'}/cC_{T2}=\sqrt{\epsilon'}/2c(C_o+C_{12}')$$ (22)

where c is the velocity of light in free space. Similarly, the voltage $V_2$ across the gap g' is given by:

$V_2=[C_{12}'/(\epsilon_2'C_2)]V$ (23)

where v is the voltage across the RF power carrying electrodes 22, 24.

With respect to the evaluation of the attenuation constant $\alpha$, ground current losses, which are estimated to be on the order 1/m or about 10% of the center conductor losses, are ignored. Furthermore, assume that the current distribution on the center RF electrode 24 is uniform; this assumption will lead to a lower value of $\alpha$; however, since the current on the underside of RF electrode 24 is much larger and uniform, this error is small. Finally, due to the relatively thick, electroplated RF power carrying electrodes of approximately 3–4 microns, bulk values for the resistivity of the gold electrodes will be assumed.

Let $I_1$ and $I_2$ be the currents on the top and bottom side of the center RF electrode 24 of width $w_1$, respectively. The power dissipated in a differential length dz is then given by:

$dP=-(I_1^2+I_2^2) Rdz$ (24)

where R is the resistance per unit length given by:

$R=\rho/(w_1\sigma)$ (25)

where ρ is the resistivity and σ the skin depth. Thus:

$dP/P=-2\alpha dz=-[(I_1^2+I_2^2) Rdz/(I^2 Z_o)]$ (26)

where $I=I_1+I_2$ and since $I_1/I_2=C_0/C_{12}'$ (27)

then:

$$\alpha = [(C_0/C_{12}' + C_{12}'/C_0)/(2 + C_0/C_{12}' + C_{12}'/C_0)][R/(2Z_o)] \quad (28)$$

With gold plating, the measured $\epsilon$, should be approximately 20–30% higher than that computed on the basis of equation (28).

Expressions for the partial capacities in FIG. 6, are obtained as follows. For t=0, $C_0$ is:

$$C_{0,t=0} = (\epsilon_0/\pi)\ln\{2[1 + \sqrt{(w_1/d_1)}]/[1 - \sqrt{(w_1/d_1)}]\}$$

where $d_1 = w_1 + 2g$

For $t \neq 0$, however, as in this case, this effect can be roughly approximated by expressing the respective fringing capacities of the microstrip in terms of a widening of the strip width by an amount $\Delta w$, which for a dielectric substrate of selective dielectric constant $\epsilon_r$, is given by:

$$\Delta w_{t,\epsilon} = [t/(\epsilon_r\pi)][1 + \ln(2h/t)] \quad (30)$$

The capacity aC, associated with this aw, is then given by:

$$\Delta C = (\epsilon_0\epsilon_r/h)\Delta w_{t\epsilon} \quad (31)$$

Now, $\Delta C$ is shared by two metallic boundaries. Let $\Delta C_1$ be the part shared without the ground and $\Delta C_2$ the part shared with the thin metallic film. These two capacities making up $\Delta C$ in equation (31) are related to each other in the inverse ratio of their respective distances. Approximately then:

$$\Delta C_1[1 + (g/h)] \approx [(\epsilon_0 t)/(\pi h)][1 + \ln(2h/t)] \quad (32)$$
$$\Delta C_1 \approx \{(\epsilon_0 t/[\pi(g + h)]\}[1 + \ln(2h/t)]$$
and
$$\Delta C_2 \approx \{\epsilon_0 tg/[\pi h(g + h)]\}[1 + \ln(2h/t)] \quad (33)$$

To apply the thickness corrections as in equations (32) and (33), only one-half of $\Delta C$'s must be applied for the partial capacities of the half structure as indicated in FIG. 6. Accordingly, the thickness corrected expressions for the partial capacities are as follows:

$$C_{0,t} = C_{0,0} + (\Delta C_1/2) = \quad (34)$$

$$(\epsilon_0/\pi)\ln\{2[1 + (\sqrt{(w_1/d_1)}]/[1 - (\sqrt{(w_1/d_1)}]\} +$$

$$C_{1,t} = \frac{\frac{1}{2}(\epsilon_0/\pi)(t/g)[1 + \ln(2h/t)]}{} \quad (35)$$

$$C_{1,0} + \Delta C_2/2 = [\epsilon_0/(2h)]\{w_1 + [g/(g+h)](t/\pi)[1 + \ln(2h/t)]\}$$
$$C_{1,t}' = mC_{1,t} = 2(w_3/w_1)C_{1,t} \quad (36)$$
$$C_{2,t} = C_{2,0} = (\epsilon_0/\pi)\ln\{2[1 + \sqrt{(w_3/d_2)}]/[1 - \sqrt{(w_3/d_2)}]\} \quad (37)$$
where
$$w_2 = w_1 + (g - g')$$
and
$$d_2 = w_2 + 2g'$$

As mentioned previously, the function F represents the effective electric field intensity per unit volt applied across the power carrying electrodes to which the optical waveguide is exposed. Thus, on account of the use of the buffer layer of dielectric constant $\epsilon_1$ the voltage across the optical waveguide for the computation of F is not unity voltage but $V_2$, as given by equation (23).

Figure 7A:
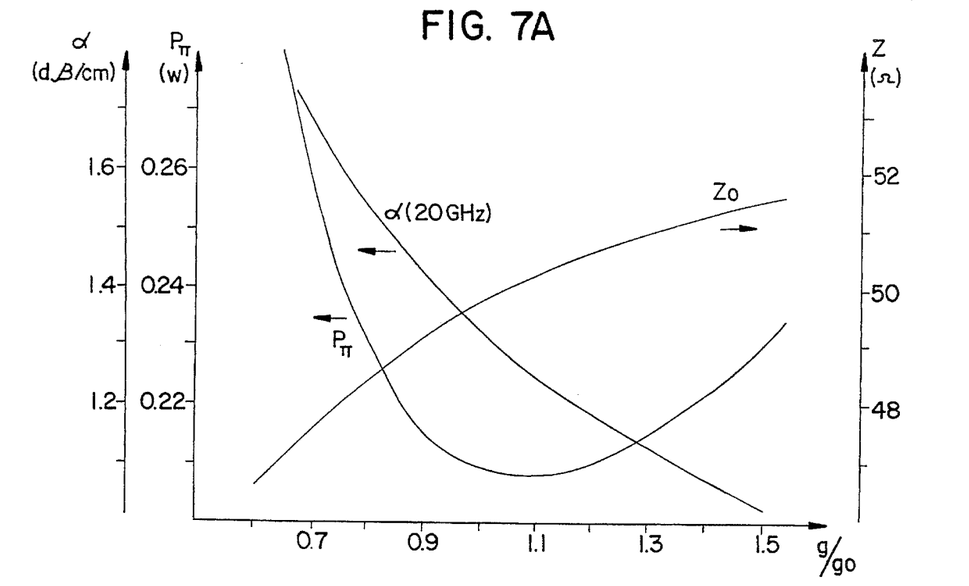
FIG. 7A is an idealized graphical diagram of the frequency response with varying RF gap distance of an optical modulator embodying this invention.
Figure 7B:
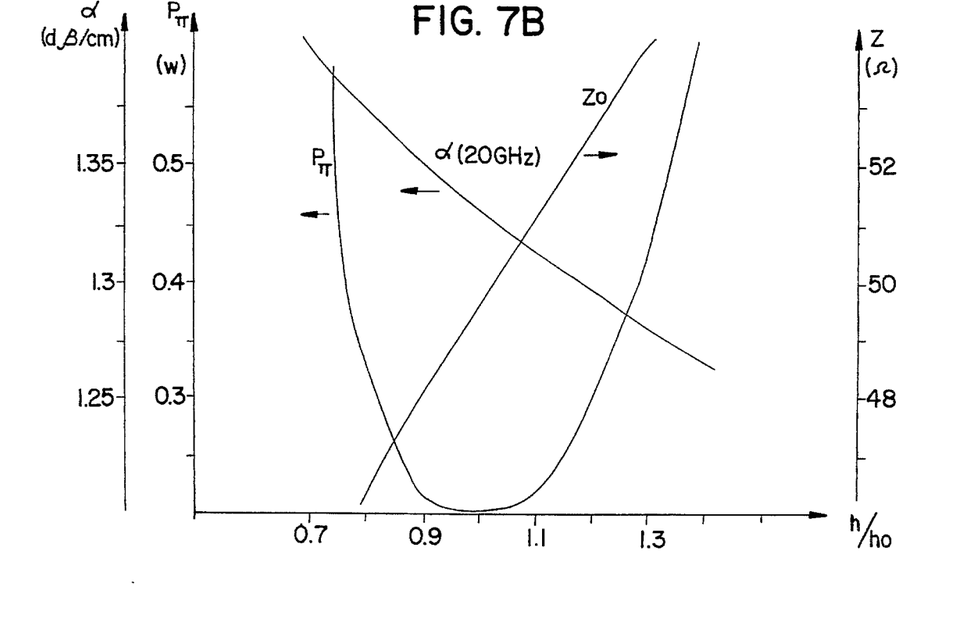
FIG. 7B is an idealized graphical diagram of the frequency response, with variations of the height of the dielectric buffer, of an optical modulator embodying this invention.

FIG. 7A shows the variations in $P_\pi$, $\alpha$ and $Z_o$, due to small variations in g about a reference dimension $g_o$. Similarly, FIG. 7B shows the variations due to changes in h about $h_o$. The reference dimensions have been determined for a velocity matched design with $\epsilon_1 = 2.8$, L<5 cm, h<5 μm, $Z_0 \approx 50$ Ω. As expected, $P_\pi$ is reasonably insensitive to changes in g about $g_o$. This is not the case, however, with respect to variations in h about $h_o$. It is seen that for optimum design these dimensions should be held to within ±10%. Thus for a nominal $h_o$, of 4.9 μm as indicated, the thickness of the buffer layer should be held to a tolerance of ±0.5 μm, a requirement which can be imposed with present day technology.

Figure 8:
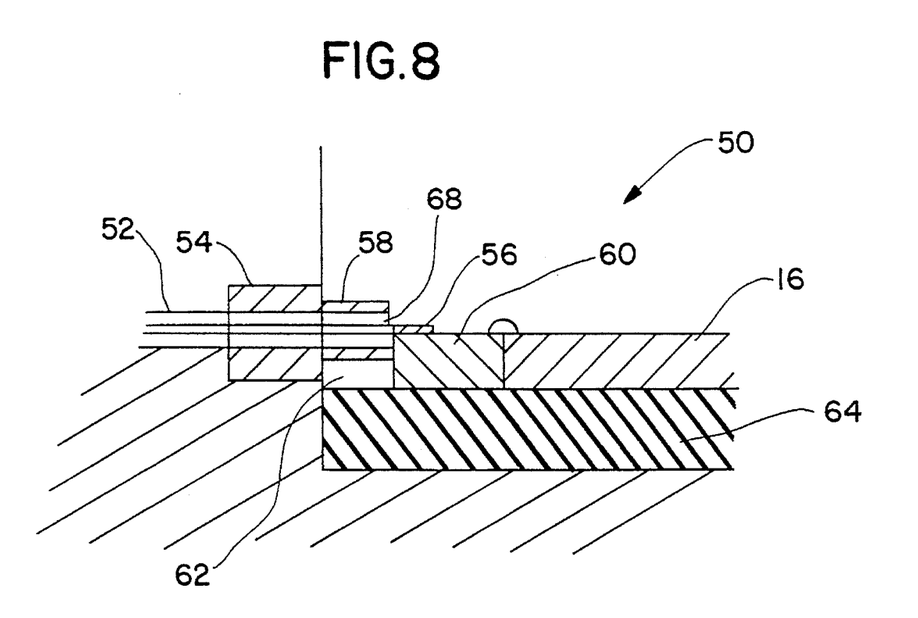
FIG. 8 is a cross-sectional view of a transition from a coaxial cable transmission line to a coplanar transmission line, which is an example of a transition that can be used with an optical modulator of this invention.

FIG. 8 shows a coaxial cable to coplanar transition. It is designed on the principle of minimizing the coupling into the stripline or coplanar transmission line and to provide proper damping for this mode to prevent resonant suck-outs.

The coaxial cable to coplanar transition is generally indicated as 50. Coaxial cable 52 terminates into a standard coaxial connector 54 which has its inner or center conductor 56 exposed. Center conductor 56 is electrically connected to one of the coplanar electrodes. The shield 58 is electrically connected to a second coplanar electrode. In the preferred embodiment, center conductor 56 is electrically connected to center RF electrode 24; shield 58 is electrically connected to outer RF electrodes 22; and the coaxial cable 52 originates at the RF signal generator 26.

Insulating dielectric 68 is abutted next to a dielectric bridge 60. The dielectric constant of the bridge 60 is greater than that of substrate 16 which is relatively high in order to arrive at suitable electrode dimensions in the coax to coplanar transition region. In the preferred embodiment, the dielectric bridge 60 is made of Duroid produced by the Rogers Company and has a $\epsilon = 10$.

A dielectric slab 64, supports the dielectric bridge 60 and the substrate 16. The dielectric slab 64 is preferably another Duroid, having a $\epsilon = 2.2$.

A dielectric support 62, which reduces resonance, is positioned under the coaxial cable end and abuts the bridge 60. Preferably, the support 62 is made of Eccosorb, manufactured by Emerson & Cummings.

Figure 3A:
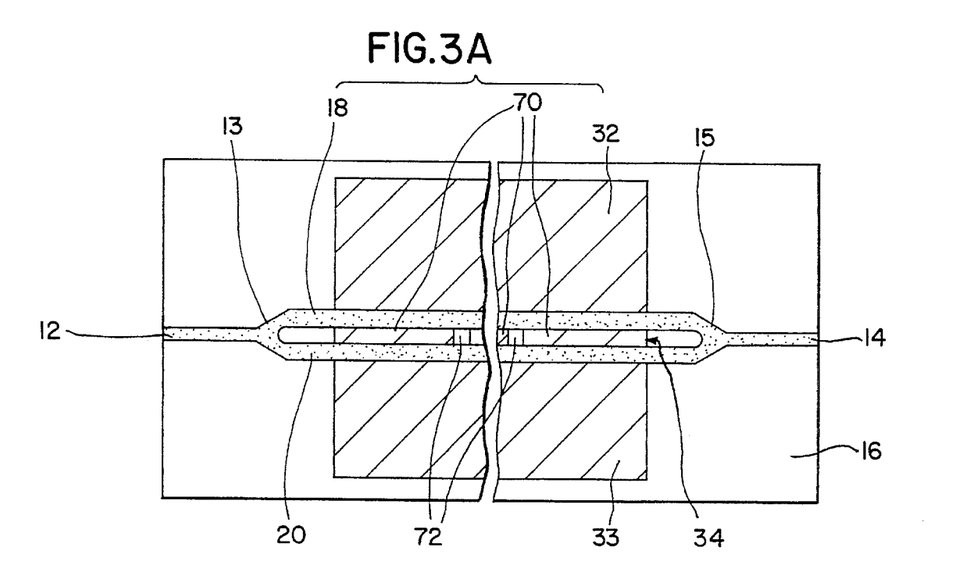
FIG. 3A is a cross-sectional view of an alternate embodiment of the invention taken along line III—III of FIG. 2.

Although the floating electrodes are electrically isolated from the RF circuitry, applicants have recognized that a certain amount of longitudinal current may be induced in the floating electrodes which can affect the performance of the modulator 10. Referring to FIG. 3A, there is shown an alternate embodiment which has been developed to provide improved performance.

As shown in FIG. 3A, the three (3) floating electrodes 32, 33, 34 are situated substantially parallel to the optical waveguide for the length of the interaction distance as in the first embodiment. However, the center electrode 34 is segmented into a series of sections 70 over its active length. Each section 70 is approximately two hundred and fifty (250) microns in length. The sections 70 are separated by gaps 72 of ten (10) microns. By sectionalizing the center electrode 34, the floating electrodes 32, 33, 34 act as a high-pass filter with a cut-off frequency well above fifty (50) GHz, and will only support transverse currents as part of the overall transmission line. Therefore, the center electrode 34 helps to suppress any coupled mode to be set up in the floating electrodes 32, 33, 34.

In this embodiment, the preferred width of the center floating electrode 34 is approximately eighty-three (83) microns while that of the outer floating electrodes 32, 33 are approximately seven hundred (700) microns. There is approximately a seven (7) micron gap space between the center floating electrode 34 and each outer electrode 32, 33 between which pass the optical waveguides 18, 20, which have a width of seven (7) microns and are approximately three (3) microns thick. The floating electrodes 32, 33, 34 are approximately the same length as the interaction distance of five (5) centimeters. The floating electrodes 32, 33, 34 are preferably gold-plated at a thickness of 1.5 microns. The increased thickness of the floating lower electrodes 32, 33, 34 over the other embodiments from 0.1 to 1.5 microns substantially eliminates any potential lossiness caused by the lower electrode system.

Also in this alternate embodiment, the dielectric buffer layer 30 situated between the RF electrodes 22, 24 and the floating electrodes 32, 33, 34 is preferably a polymer made from Dow Cyclotene® 3022-57 bisbenzocyclobutene (BCB) monomer resin and Mesitylene solvent having a $\epsilon$ equal to 2.7. The thickness of the dielectric buffer layer 30 is approximately ten (10) microns. In order to prevent dielectric slab resonances above twenty-five GHz, the thickness of the $LiNbO_3$ substrate 16 is reduced from the 0.1 centimeters of the previous embodiments to 0.05 centimeters. The $LiNbO_3$ substrate 16 is 6.2 centimeters in length and 0.75 centimeters wide in order to provide sufficient structural support for the optical waveguides 18, 20, the RF electrodes 22, 24, and the floating electrodes 32, 33, 34.

The embodiments described herein are not meant to be limiting. Modifications of the invention by those skilled in the art will be apparent. Such modifications are covered by the scope and spirit of the following claims.

What is claimed is:

1. A modulator for modulating optical waves with RF waves, comprising:

a dielectric substrate;

two optical waveguides situated at least partially within the substrate substantially parallel to each other;

a transmission line including electrodes situated over the substrate for carrying the RF waves;

a dielectric buffer layer for velocity matching the RF waves with the optical waves, situated generally between the substrate and the electrodes; and electrically floating electrode means generally situated between the substrate and the buffer layer, said floating electrode means including a series of electrically isolated floating electrode segments situated between said waveguides.

2. The modulator of claim 1 wherein said floating electrode means further includes a floating electrode associated with each waveguide, situated along side Of each waveguide opposite to said series of floating electrode segments.

3. The modulator of claim 1, wherein a portion of each of said optical waveguides is disposed above said substrate, and said portion is substantially rectangular in cross section thereby defining ridged waveguides.

4. The modulator of claim 1, wherein said optical waveguides are situated entirely within said substrate and made of titanium diffused into the dielectric substrate.

5. The modulator of claim 1, wherein the buffer layer has a dielectric constant lower than the dielectric constant of silicon dioxide.

6. The modulator of claim 1, wherein the dielectric buffer layer is a polymer.

7. The modulator of claim 1, wherein the RF transmission line has a characteristic impedance of approximately 50 Ω.

8. The modulator of claim 1, wherein the RF waves interact with the optical waves over a predetermined distance and the length of the floating electrode means is substantially equal to the interaction distance.

9. The modulator of claim 2, wherein the floating electrodes and segments are vacuum deposited onto the substrate and the RF electrodes are deposited over the buffer layer.

10. The modulator of claim 2, wherein the floating electrodes are of a generally rectangular shape and are situated substantially parallel to the waveguides.

11. A modulator for modulating optical waves with an electromagnetic signal comprising:

an electro-optic substrate having at least one optical waveguide for carrying said optical waves;

a buffer layer disposed over said substrate;

an electric transmission line disposed over said buffer layer having a signal-carrying electrode for carrying said electromagnetic signal and at least one ground electrode selectively spaced from said signal-carrying electrode defining a shunt capacitance therebetween, said electromagnetic signal modulates said optical waves by producing an electric field between said signal-carrying electrode and said ground electrode which couples with said optical waveguide; and floating electrode means adjacent to at least one side of said waveguide for increasing the shunt capacitance between said electrodes proximate said optical waveguide for increasing the coupling between said electric field and said optical waveguide, said floating electrode means including a series of floating electrode segments disposed between said buffer layer and said substrate, generally parallel to one side of said waveguide.

12. A modulator according to claim 11 further comprising two optical waveguides and three RF electrodes wherein said floating electrode segments are disposed between said two optical waveguides.

13. A modulator according to claim 12 wherein said floating electrode means further includes two outer floating electrodes, each situated generally parallel to one of said two optical waveguides opposite from said floating electrode segments.

14. A modulator according to claim 11 wherein said buffer layer has a dielectric constant lower than the dielectric constant of said substrate.

15. A modulator according to claim 11 wherein said optical waveguide is a ridged waveguide.

16. An optical modulator, modulated by RF energy, comprising:

a dielectric substrate;

an optical waveguide situated proximate the substrate;

a plurality of electrically floating electrodes placed over the substrate for intensifying an electric field generated by the RF waves proximate the optical waveguide;

at least one of said floating electrodes comprised of a series of spaced electrode segments;

an intermediate dielectric buffer layer placed over said floating electrodes; and a plurality of electrodes placed over the intermediate dielectric layer for carrying the modulated RF energy.

17. A modulator according to claim 16 wherein said buffer layer has a dielectric constant lower than the dielectric constant of said substrate.

18. A modulator according to claim 16 wherein said optical waveguide is a ridged waveguide.

* * * * *

UNITED STATES PATENT AND TRADEMARK OFFICE
CERTIFICATE OF CORRECTION

PATENT NO. : 5,455,876                    Page 1 of 2

DATED : October 3, 1995

INVENTOR(S) : Hopfer et al.

It is certified that error appears in the above-identified patent and that said Letters Patent is hereby corrected as shown below:

Column 5, line 49, delete "An" and insert therefore --$\Delta$n--.

Column 6, line 12, delete "$\cos^2(\pi/4+\phi) = \frac{1}{2} - \phi = \frac{2}{3}(\phi)^3 = \ldots$" and insert therefore --$\cos^2(\pi/4+\phi) = \frac{1}{2} - \phi + \frac{2}{3}(\phi)^3 + \ldots$--.

Column 6, equation 8, delete "+178" and insert therefore --$\frac{1}{2}$--.

Column 7, line 65, delete "Z $_o$" and insert therefore --$Z_0$--.

Column 8, line 50, delete "F" and insert therefore --$\Gamma$--.

Column 8, line 60, delete "$\sqrt{e_{eff+b}} = 2.2$" and insert therefore --$\sqrt{e_{eff}} = 2.2$--.

Column 8, line 64, delete "F" and insert therefore --$\Gamma$--.

Column 9, line 60, delete "$C_{00} = C_o$" and insert therefore --$C_{00} = C_0$--.

Column 10, line 13, delete "$C_{T2} = 2(C_0 + C_{12})$" and insert therefore --$C_{T2} = 2(C_0 + C_{12}')$--.

Column 10, line 31, after "$cC_{T2}$" delete ")".

UNITED STATES PATENT AND TRADEMARK OFFICE
CERTIFICATE OF CORRECTION

PATENT NO. : 5,455,876

DATED : October 3, 1995

INVENTOR(S) : Hopfer et al.

It is certified that error appears in the above-identified patent and that said Letters Patent is hereby corrected as shown below:

Column 11, line 3, delete "e," and insert therefore --$\alpha$--.

Column 11, line 20, delete "aC," and insert therefore --$\Delta C$,--.

Column 11, line 20, delete "aw," and insert therefore --$\Delta w$--.

Column 11, line 31, after "≈ {" delete "(".

Column 11, line 43, after "{2[1+" delete "(".

Column 11, line 43, after "/[1-" delete "(".

In claim 2, column 13, line 42, delete "Of" and insert therefore --of--.

Signed and Sealed this

Twenty-seventh Day of February, 1996

*Attest:*

BRUCE LEHMAN

*Attesting Officer*     *Commissioner of Patents and Trademarks*